(12) United States Patent
Gerhart et al.

(10) Patent No.: US 7,295,312 B1
(45) Date of Patent: Nov. 13, 2007

(54) RAPID 4-STOKES PARAMETER DETERMINATION VIA STOKES FILTER WHEEL

(75) Inventors: Grant R. Gerhart, Bloomfield Hills, MI (US); Roy M. Matchko, Payson, AZ (US)

(73) Assignee: United States of America as represented by the Secretary of the Army, Washington, DC (US)

( * ) Notice: Subject to any disclaimer, the term of this patent is extended or adjusted under 35 U.S.C. 154(b) by 73 days.

(21) Appl. No.: 11/434,576

(22) Filed: May 10, 2006

(51) Int. Cl.
*G01J 4/00* (2006.01)
(52) U.S. Cl. ..................................... 356/364; 356/368
(58) Field of Classification Search ................. 356/364
See application file for complete search history.

(56) References Cited

U.S. PATENT DOCUMENTS

| | | | |
|---|---|---|---|
| 3,759,618 | A | 9/1973 | Rogers et al. |
| 4,019,819 | A | 4/1977 | Lodzinski |
| 4,159,874 | A | 7/1979 | Dearth et al. |
| 4,478,513 | A | 10/1984 | Skinner et al. |
| 5,396,329 | A | 3/1995 | Kalawsky |
| 5,949,480 | A | 9/1999 | Gerhart et al. |
| 6,061,091 | A | 5/2000 | Van de Poel et al. |
| 6,339,426 | B1 | 1/2002 | Lui et al. |
| 6,373,614 | B1 | 4/2002 | Miller |
| 6,393,145 | B2 | 5/2002 | Betrisey et al. |
| 6,552,836 | B2 | 4/2003 | Miller |
| 6,721,050 | B2 | 4/2004 | Vecer et al. |
| 6,822,737 | B2 | 11/2004 | Kurata et al. |
| 2004/0056966 | A1* | 3/2004 | Schechner et al. ....... 348/229.1 |

OTHER PUBLICATIONS

U.S. Appl. No. 10/822,355, filed Apr. 13, 2004, Gerhart, et al, Simultaneous 4-Stokes Parameter Determination Using a Single Digital Image.
U.S. Appl. No. 11/158,357, filed Jun. 20, 2005, Gerhart, et al, System and Method for Determining Stokes Parameters.

* cited by examiner

*Primary Examiner*—Roy M. Punnoose
(74) *Attorney, Agent, or Firm*—David L. Kuhn; Thomas W. Saur; Luis Miguel Acosta

(57) ABSTRACT

A system for determining polarization profiles of points in a scene from video frames using Stokes parameters includes a scene having a region that emits scene light rays that correspond to the points in the scene, an optical chopper controller, a rotating Stokes filter wheel that includes five trigger holes, three rotating linear polarizers, a circular polarizer, and a reference screen, a color filter, a video camera having a video frame, and a computer system having a frame grabber apparatus. The scene light rays are transmitted through the Stokes filter and the color filter to the video camera. Images corresponding to the scene light rays are projected onto respective pixels in the video frame and recorded as two-dimensional (2-D) arrays, and the images corresponding to the scene light rays from four unique images, obtained from light transmitted consecutively through three linear polarizers and a circular polarizer of the rotating Stokes filter wheel, are used by programming in the computer system to calculate respective Stokes parameters of the points in the scene.

16 Claims, 3 Drawing Sheets

RAPID 4-STOKES PARAMETER DETERMINATION VIA STOKES FILTER WHEEL

CROSS-REFERENCE TO RELATED APPLICATIONS

The present invention may relate to applications having Ser. Nos. 10/822,355, filed Apr. 13, 2004, and 11/158,357, filed Jun. 20, 2005, which are hereby incorporated by reference in their entirety.

GOVERNMENT INTEREST

The invention described here may be made, used and licensed by and for the U.S. Government for governmental purposes without paying royalty to us.

BACKGROUND OF THE INVENTION

1. Field of the Invention

The present invention generally relates to a system and method for rapidly determining Stokes parameters.

2. Background Art

The Stokes method provides a seminal method for the determination of a state of polarization of a beam of light using measurable quantities. The Stokes method includes the process of measuring four intensities of the light beam. Each measurement corresponds to the intensity of the light beam after the light beam passes through each of four different filter system arrangements. The four Stokes parameters, by convention, are generally designated $S_0$, $S_1$, $S_2$, and $S_3$. The four Stokes parameters are derived from the four measured light beam intensities, and form a four-element column vector in four-dimensional mathematical space.

Since the discovery of the Stokes method in 1852, many conventional filter systems based on the Stokes method have been developed. Typically, in conventional approaches four separate, unique images are used to calculate the Stokes parameters for each element in a scene. A manually rotated retarder and a linear polarizer are used in conventional approaches to obtain the data used for determining the Stokes parameters.

However, the conventional approaches of using the Stokes parameters for acquiring polarization information from images have the deficiencies of sometimes having errors in temporal registration and in spatial registration. The temporal registration errors occur because of the capture time differential to generate separate images in conventional approaches. The capture time differential can affect polarization measurements that are taken outdoors when changing sun position, cloud position, and the like change the intensity or the polarization state of the light entering the filter system. Indoors (e.g., in a laboratory), temperature, atmospheric pressure, and density or concentration of variations associated with scene elements can change the polarization state of the light entering the filter system during the time duration used to record four separate images.

Spatial registration errors can occur when conventional approaches are used whenever the scene is imaged onto the image plane of the camera from different positions. For example, when four adjacent lenses are used to simultaneously image the scene on the image plane of the camera, each lens will obtain an image of the scene from a slightly different perspective. As such, the four images will be different, and spatial errors can occur.

Thus, there exists a need and an opportunity for an improved system and an improved method for the determination of polarization profiles of points in a scene from video frames. Such an improved system and method may overcome one or more of the deficiencies of the conventional approaches.

SUMMARY OF THE INVENTION

Accordingly, the present invention may provide an improved system and an improved method for the determination of polarization profiles of points in a scene from video frames using rapidly determined Stokes parameters. The present invention may significantly reduce temporal errors and eliminate spatial errors when compared to conventional approaches for determining Stokes parameters. The present invention generally comprises an optical chopper controller, a motorized rotating Stokes filter wheel, a narrowband color filter, a high speed video camera, and a computer system including a frame grabber, and software to coordinate operation of the optical chopper controller, the frame grabber and the video camera, and a polarization calibration standard.

Light from points in a scene are generally transmitted through the system and exit from the system having respective intensities that may be uniquely attenuated for each wavelength of the light. A narrowband color filter is generally used to select a particular wavelength. The respective attenuated intensities in each of four scene-images are generally used to calculate the respective Stokes parameters for selected points in the scene for the selected wavelength.

The system and method of the present invention may express the Stokes parameters explicitly as a function of wavelength. As such, the present invention may overcome the deficiency of the different phase differential for each individual wavelength that is typically introduced by the retarder that is implemented in conventional approaches.

A polarization standard that generally comprises a linear polarizer and a circular polarizer of known azimuth and angle of ellipticity may be included in the scene to provide testing for the introduction of pseudo polarization parameters. The Stokes parameters may be calculated for each point in the scene.

The present invention generally provides for obtaining the four Stokes parameters more rapidly when compared with conventional approaches. The present invention may provide for the generation of video images having changing polarization, and may reduce, minimize or eliminate spatial and temporal registration errors when compared to conventional approaches.

According to the present invention, a system for determining polarization profiles of points in a scene from video frames using Stokes parameters is provided. The present invention generally comprises an optical chopper controller, a motorized rotating Stokes filter wheel, a narrowband color filter, a high speed video camera, a computer system including a frame grabber, and software to coordinate the operation of the optical chopper controller, the frame grabber and the video camera, and a polarization calibration standard.

Images corresponding to the scene light rays may be projected onto respective pixels in the video frame and recorded as two-dimensional (2-D) arrays. The images corresponding to the scene light rays from four unique images obtained from light transmitted consecutively and rapidly through three linear polarizers and a circular polarizer of the rotating Stokes filter wheel are generally used by programming in the computer system to calculate respective Stokes parameters of the points in the scene.

Further, according to the present invention, a method of reducing spatial and temporal errors in polarization profiles of points in a scene from video frames using Stokes parameters that are obtained via the system described above is provided.

The above features, and other features and advantages of the present invention are readily apparent from the following detailed descriptions thereof when taken in connection with the accompanying drawings.

DETAILED DESCRIPTION OF THE PREFERRED EMBODIMENT(S)

The present application generally describes a system and a method of determination of Stokes parameters for a given example. However, one of ordinary skill in the art would understand that the system and method described herein may be implemented to meet the design criteria or to optimize the Stokes parameter determination of any particular application using the more general formulae as presented, for example, in U.S. patent application Ser. No. 11/158,357, filed Jun. 20, 2005 which, as noted previously, is incorporated by reference in its entirety.

Figure 1:
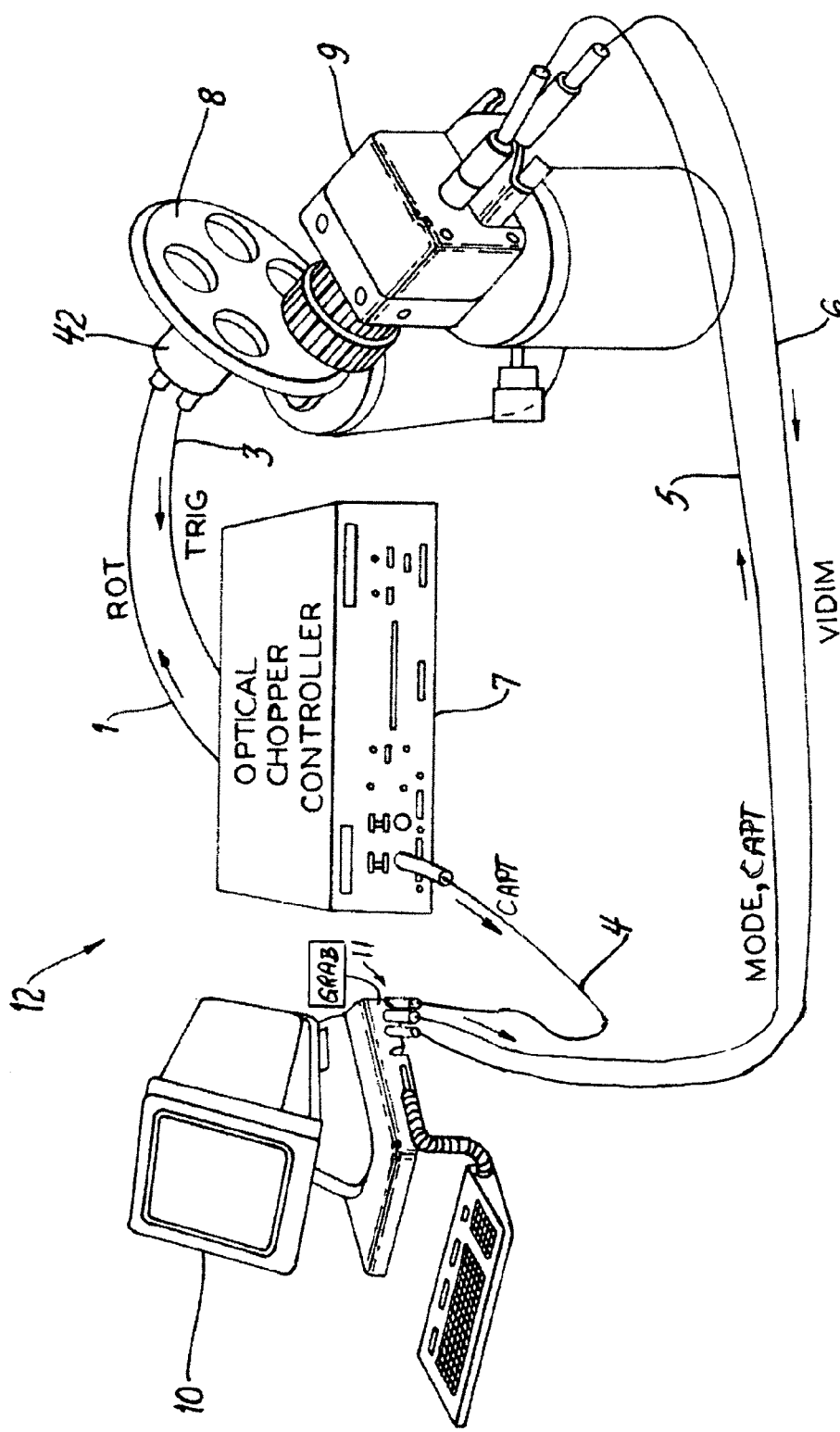
FIG. 1 is a diagram of a system for determining Stokes parameters according to the present invention.
Figure 2:
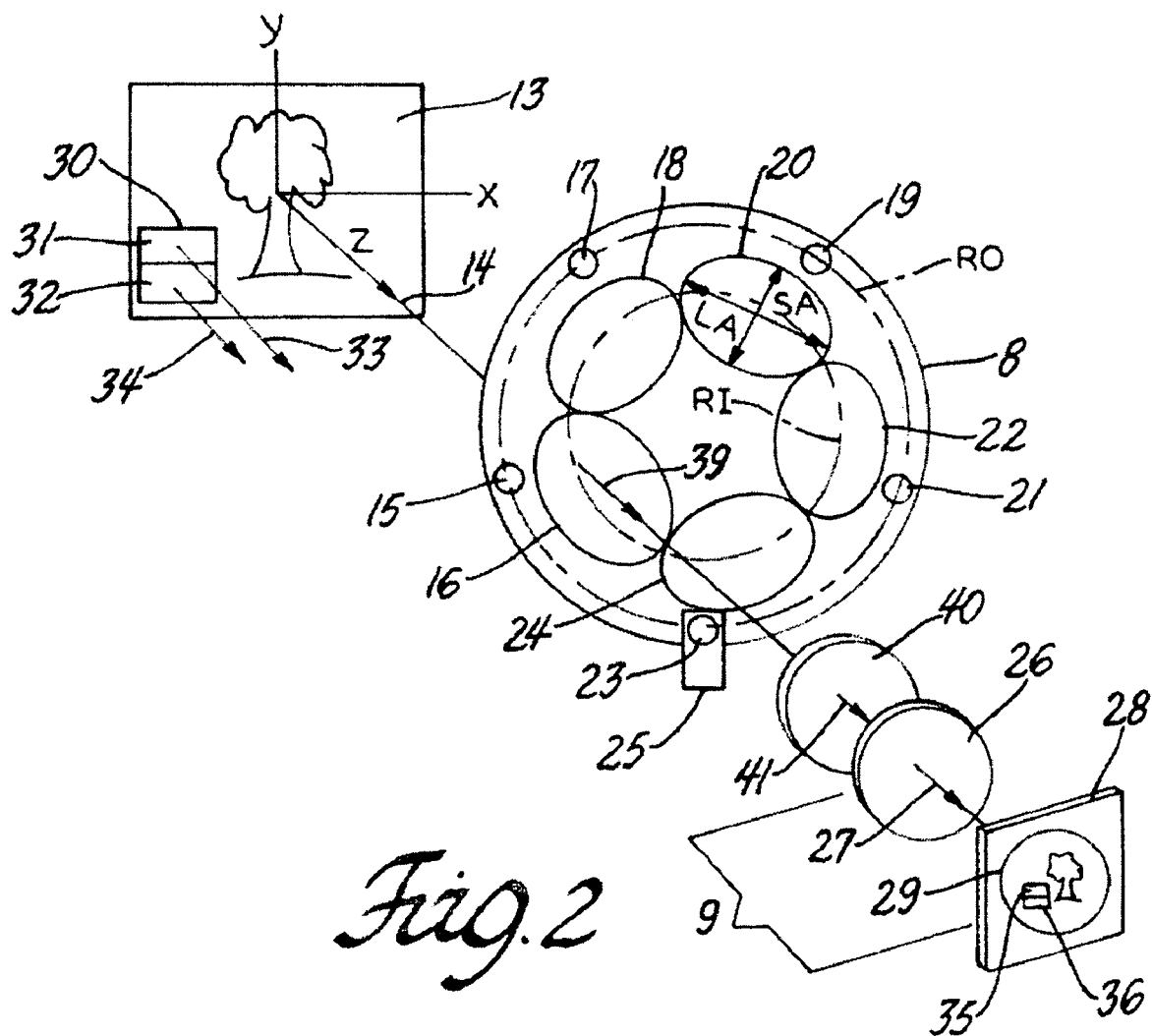
FIG. 2 is a diagram of the transmitted light from the scene and the polarization standard through the system according to the present invention.
Figure 3:
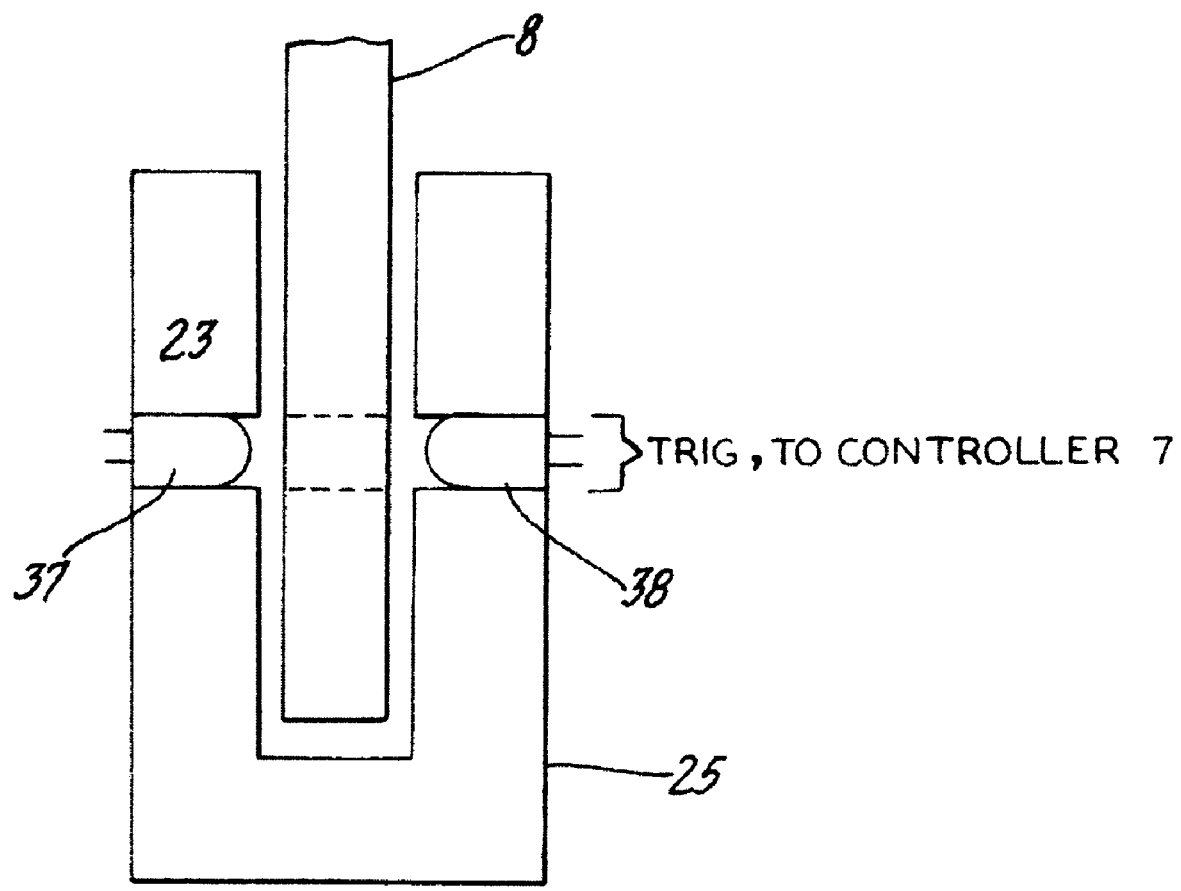
FIG. 3 is a diagram of a trigger sensor that may be implemented in connection with the present invention.

With reference to FIGS. 1-3, the preferred embodiments of the present invention will now be described in detail. Generally, the present invention provides an improved system and an improved method for the determination of polarization profiles of points in a scene from video frames using Stokes parameters. In particular, the present invention may advantageously generate the Stokes parameters more rapidly and accurately than conventional approaches. The present invention generally includes an optical chopper controller that is implemented in connection with a mechanical device (e.g., a wheel rotated by a precision motor, the wheel having apertures through which light rays pass) to form an optical chopper.

The optical chopper controller generally performs at least two operations. The optical chopper controller may be configured to set (i.e., determine, establish, etc.) the rotation frequency of the Stokes filter wheel (e.g., via a control signal, ROT) and may also be configured to send pulsed trigger signals (e.g., TTL 5 volt signals, TRIG) to a frame grabber apparatus and a video camera to activate a shutter in the video camera. During each rotation of the Stokes filter wheel, five circular trigger holes that are located around the perimeter of the Stokes filter wheel generally pass through a sensor.

The sensor may, in one example (see, FIG. 3), comprise an infrared transmitter and an infrared receiver. As a trigger hole in the Stokes filter wheel passes through the sensor, the trigger (or synchronization) signal (or command) TRIG may be generated by the sensor (i.e., the infrared receiver). The trigger signal may be sent (transmitted) to (and received by) the video camera via the optical chopper controller and the frame grabber. The voltage associated with the synchronization/trigger signal generally activates the shutter of the video camera to provide synchronization of the video camera and the Stokes filter wheel.

The trigger holes around the perimeter of the Stokes filter wheel are generally substantially equally spaced and are positioned such that a polarization element (e.g., a polarizer) that is inlayed (i.e., inset, fixed, positioned, mounted, disposed, etc.) in the Stokes filter wheel is present in the field of view of the video camera when the shutter of the video camera is open. That is, the light rays that are emitted from points in the scene are optically chopped.

The Stokes filter wheel generally further includes five oval shaped filter/reference apertures. The oval shaped filter/reference apertures are generally disposed adjacent to a respective circular trigger hole, and towards the center of the Stokes filter wheel. The oval shaped filter/reference wheels are "large" (i.e., at least three times larger in total area than the respective circular holes).

The five large filter/reference apertures on the Stokes filter wheel generally include, respectively, three linear polarizers, one circular polarizer, and a reference screen. The reference screen is generally implemented to identify a completed revolution of the rotating Stokes filter wheel. The linear and circular polarizers assembled in the Stokes filter wheel may have any orientation; however, to simplify calculations and to optimize results, when one of the linear polarizers enters the field of view of the video camera, the orientation of the transmission axis of the linear polarizer may be one of horizontal, vertical, and 45 degrees from the horizontal. When the circular polarizer appears in the field of view of the video camera, the fast axis of the retarder element of the circular polarizer may be vertical.

The large filter/reference apertures of the Stokes filter wheel may be substantially oval shaped. The oval shaped filter/reference apertures may reduce or eliminate the possibility of a reduction in the field of view of the video camera during exposure, as can occur when circular apertures are implemented to hold the respective filters.

Each closure of the shutter of the video camera generally sends (transmits) the recorded image (e.g., an image, VIDIM) to the frame grabber apparatus. The frame grabber may format the image according to preset (i.e., predetermined, pre-selected, chosen, etc.) instructions in coordinating software and store the image in memory of a computer.

The present invention may reduce temporal registration errors when compared to conventional approaches for using Stokes parameters by implementing a precision motor for the rotation of the Stokes filter wheel. The degree of precision that is implemented is generally selected to provide registration error reduction to a predetermined level.

Because positive ellipticity is generally introduced into the imagery when the light increases between exposures, and negative ellipticity is generally introduced into the imagery when the light decreases between exposures, the present invention may include a polarization standard in the scene to determine the validity of the data. The polarization standard generally comprises a linear polarizer and a circular polarizer.

The present invention may reduce or eliminate spatial registration errors when compared to conventional approaches by implementing a single lens for imaging onto the image plane of the video camera.

The system and method of the present invention generally provide for determining polarization profiles of a scene via near real time calculation of the respective Stokes parameters. The present invention generally comprises an optical chopper controller, the polarization calibration standard, the motorized rotating Stokes filter wheel, a narrowband color filter, a high speed video camera having a video frame, and a computer system containing the frame grabber and respective software to coordinate operation of the optical chopper controller, the frame grabber and the video camera. The polarization calibration standard generally comprises a calibrated linear polarizer and a calibrated circular polarizer.

The motorized rotating Stokes filter wheel generally comprises five trigger holes and five respective unique filter/reference apertures with inlayed polarization elements. The Stokes filter wheel is generally attached to a precision high speed motor. An optical chopper controller generally supplies (i.e., provides, generates, etc.) a variable frequency control signal (i.e., the signal ROT) to the Stokes filter wheel motor. Three of the filters in the filter/reference apertures generally comprise linear polarizers, each having a different (e.g., horizontal, vertical, and 45 degrees) orientation with respect to light rays received from the scene. A fourth filter in one of the filter/reference apertures generally comprises a circular polarizer, and the fifth filter/reference aperture generally includes the reference screen which is used to indicate a completed revolution of the rotating Stokes filter wheel.

The present invention generally calculates the four Stokes parameters (i.e., the parameters $S_0$, $S_1$, $S_2$, and $S_3$) for each individual image pixel using four two-dimensional (2-D) images from the video camera (i.e., four video images, VIDIM) and appropriate polarization determination equations (described in detail below).

Light from the scene may be transmitted, generally as rays, through the motorized rotating Stokes filter wheel. The rotating Stokes filter wheel generally comprises three linear polarizers and a circular polarizer that correspond to the four video images VIDIM that are used to calculate the four Stokes parameters, and a blank reference (i.e., a video image VIDIM that indicates a completed revolution of the Stokes filter wheel). The light that exits the Stokes filter wheel has generally been attenuated and may be recorded using the video camera and computer system. The video camera generally includes an array (generally a 2-D array) of light receptors that operate to form respective pixels of a video frame (i.e., the video frame that corresponds to the video image VIDIM).

The high speed video camera generally determines the intensity (i.e., level, amount, etc.) of the attenuation to the light transmitted through the system of the present invention. The present invention may generate uniquely attenuated images of the light from the scene on each video frame.

Also, according to the present invention, a computer (e.g., processor, microprocessor, controller, etc.) may be implemented with appropriate programming (e.g., software, firmware, and the like) stored in suitable memory (e.g., RAM, PROM, EPROM, EEPROM, flash memory, and the like) to perform processes (i.e., instructions, routines, algorithms, steps, blocks, methods, operations, equations, etc.) of the present invention including a cropping (e.g., editing) process for the selection of corresponding elements from each frame containing images of the scene A calibration equation may also be implemented via the computer programming to convert respective pixel values to optical densities, and the optical densities may be converted to relative intensities.

Each scene image generally comprises a rectangular array of pixel values (i.e., a matrix) that corresponds to the attenuated intensities of the light that is transmitted through the motorized rotating Stokes filter wheel. The calibration equation generally converts respective pixel values to optical densities and to relative intensities.

Four unique scene images VIDIM that are related to (correspond to) the four filters in the oval shaped filter apertures of the Stokes filter wheel are generally selected as the basis for calculation of the Stokes parameters for each pixel in the scene. Polarization parameters including the degree of polarization, polarization azimuth angle, and polarization ellipticity angle may be calculated for each pixel using the Stokes parameters associated with each pixel value.

The present invention generally provides for the association of red-green-blue (RGB) values with normalized values of the Stokes parameters. The present invention generally provides for close to (i.e., nearly, substantially, about, etc.) real time generation of video images having changing polarization values. The total time duration to acquire four unique images of a scene is generally governed by (i.e., corresponds to, is related to, etc.) the frame rate of the video camera in association with the Stokes filter wheel rotational speed as determined by the control signal ROT. The frame rate of the video camera is generally synchronized to rotating speed (angular velocity) of the motorized rotating Stokes filter wheel via the synchronization (or trigger) signal TRIG that is generated by the optical chopper controller in connection with the circular trigger holes in the Stokes filter wheel (i.e., the signal ROT may be generated by the optical chopper controller, at least in part, in response to the signal TRIG). When the calculated polarization parameters that are obtained from the polarization standard are determined to fail to match the respective known values that have been predetermined in a laboratory under controlled lighting conditions, temporal registration errors or improper conditioning may have occurred and the data is generally considered invalid.

The system and method of the present invention may be advantageously implemented in connection with any appropriate wavelength of light (e.g., visible, infrared, ultraviolet, etc.). The system and method of the present invention may be advantageously implemented in connection with any appropriate video recording protocol or format (e.g., analog, digital, etc.). The computer programming of the present invention may be configured to provide for processing that includes cropping (editing), curve fitting, mathematical calculations, manipulation of video frames, pseudo-coloring of polarization parameters, and conversion of images into at least one standard format.

Referring generally to FIGS. 1-3, in combination, a system 12 of the present invention is shown. The system 12 generally comprises a computer system 10 having a frame grabber apparatus 11, a high speed video camera 9, an optical chopper controller 7, a sensor 25, a motor 42, and a rotating Stokes filter wheel 8. The computer system 10 may be internally electrically coupled to the frame grabber 11, the frame grabber apparatus 11 may be electrically coupled to the optical chopper controller 7 and to the video camera 9, and the chopper controller 7 may also be electrically coupled to the sensor 25 and to the motor 42. The computer system 10 generally contains appropriate programming to perform the operations (i.e., processes, calculations, steps, blocks, algorithms, etc.) of the present invention.

The system 12 may be implemented as a system for the determination of polarization profiles of points in a scene 13 from video frames 28 using Stokes parameters (i.e., the parameters $S_0$, $S_1$, $S_2$, and $S_3$). The system 12 of the present invention generally provides at least one system and method for obtaining polarization profiles from the video camera 9. The system 12 of the present invention generally produces (i.e., generates, provides, etc.) a sufficient number of unique scene images 29 to obtain (i.e., generate, calculated, determine, etc.) the respective four Stokes parameters in nearly (i.e., with very insignificant time delay, substantially, almost, about, approximately, etc.) real time.

The total time duration to obtain the four images generally used to obtain the four Stokes parameters $S_0$, $S_1$, $S_2$, and $S_3$ for each pixel in the scene is generally regulated by the rotational speed (e.g., revolutions per minute, RPM) of a motorized rotating Stokes filter wheel 8 and the frame rate (e.g., frames per second, FPS) of the video camera 9. The Stokes filter wheel 8 is generally mechanically coupled to and rotated by the motor 42. The motor 42 is generally implemented as a precision motor (i.e., a motor having rotational frequency stability about 250 ppm/deg. C., and RMS phase jitter of less than 0.5% over all normal frequency ranges of operation). The rotational speed of the motor 42 is generally determined (i.e., established, set, chosen, etc.) in response to the control signal ROT.

The system 12 generally includes the optical chopper controller 7, the motorized rotating Stokes filter wheel 8, the high speed video camera 9, and the computer system 10 generally includes the frame grabber apparatus 11. The system 12 generally is used in connection with the scene 13. The scene 13 is generally implemented having a horizontal axis, x, and a vertical axis, y, that is perpendicular to the x axis. A z axis is generally mutually perpendicular to the x and y axes. The system 12 generally further comprises a polarization standard 30 that is implemented in connection with (e.g., within a region of) the scene 13.

A user (e.g., operator, etc.) of the system 12 generally desires to obtain polarization information regarding elements of the scene 13. An optical chopper is generally implemented as a mechanical or electromechanical device for passing and then interrupting a beam of light for a known brief interval of time. The optical chopper controller 7 and the rotating Stokes filter wheel 8 generally comprise an implementation of an optical chopper. The control signal ROT may be generated by the optical chopper controller 7 in response to the frame rate of the video camera 9 and the synchronization trigger signal TRIG.

A frame grabber apparatus (i.e., subsystem, circuit, device, etc.) is generally a component of a computer system that is implemented to perform digitizing analog video signals. A typical implementation of a frame grabber comprises a circuit to recover the horizontal and vertical synchronization pulses from the input signal, an analog-to-digital converter, a NTSC/SECAM/PAL color decoder circuit (which may be implemented in software), a memory for storing the acquired image (e.g., a frame buffer), a bus interface to the main processor in the computer system for acquisition control and data access. Frame grabbers such as the apparatus 11 generally store and also compress video frames in substantially real time using algorithms such as MPEG, JPG, TIF, and the like, or any other appropriate format to meet the design criteria of a particular application.

The frequency (i.e., rate of revolution, angular velocity, etc.) of the rotating Stokes filter wheel 8 is generally selected (e.g., chosen, determined, varied, controlled, adjusted, etc.) via the signal ROT that is generated by the optical chopper controller 7 (in connection with the computer system 10) and sent to the Stokes filter wheel 8 via an electrical connection 1 (e.g., electrical coupling, interface, wiring, cable, interconnect, etc.). As such, the controller 7 may control the rotation of the Stokes filter wheel 8 in response to the signal ROT which is generally a variable frequency control signal. The optical chopper controller 7 and the computer system 10 may generate the control signal ROT such that the angular velocity and angular acceleration of the rotating Stokes filter wheel 8 are controlled within predetermined limits. The rotational speed of the motor is generally set once, prior to data acquisition, to meet the criteria of a particular application.

The computer system 10 may be used to select a mode of operation (e.g., internal triggering, external triggering, etc.) provided as desired by the user, the region of interest (ROI, the pixel area to be used in the exposure), and the exposure time of the video camera 9 via a control or selection signal (e.g., a control signal, MODE). The computer system 10 may be electrically coupled to the frame grabber subsystem 11. The respective selections MODE are generally transmitted to the frame grabber 11 via an internal electrical connection, and the frame grabber 11 may transmit the respective selections via the control signal MODE to the video camera 9 via an electrical connection 5.

The rotating Stokes filter wheel 8 generally comprises five trigger holes (e.g., holes 15, 17, 19, 21, and 23), three linear polarizers (e.g., polarizers 18, 20, and 22) that are generally sequentially positioned about the Stokes filter wheel 8, a circular polarizer (e.g., polarizer 16), and a reference screen (e.g., the reference screen 24). When one of the trigger hole 15, 17, 19, 21, and 23 passes between an infrared transmitter 37 and an infrared receiver 38 that are implemented in connection with the sensor 25 (see FIG. 3), respective trigger signals TRIG may be generated and sent to the optical chopper controller 7 via an electrical connection 3.

The three linear polarizers 18, 20, and 22, the circular polarizer 16, and the reference screen 24 are generally consecutively mounted (e.g., inset, inlayed, fixed, etc.) into oval (ellipsoidal) shaped filter/reference apertures in the Stokes filter wheel 8. The oval shaped filter/reference apertures generally have a smaller axis (e.g., axis SA) that is radially disposed on the Stokes filter wheel 8, and a larger axis (e.g., axis LA) that is disposed in a circular band (e.g., a band centered on a radius, RI) on the Stokes filter wheel 8.

The apertures that correspond to the filters/reference screen 18, 20, 22, 16, and 24 are generally disposed radially internally (towards the center) with respect to corresponding (respective) trigger holes on the Stokes filter wheel 8. That is, the circular polarizer 16 may be radially internal to the trigger hole 15, the linear polarizer 18 may be radially internal to the trigger hole 17, the linear polarizer 20 may be radially internal to the trigger hole 19, the linear polarizer 22 may be radially internal to the trigger hole 21, and the reference screen 24 may be radially internal to the trigger hole 23. The trigger holes 15, 17, 19, 21, and 23 are generally disposed sequentially (consecutively) on the Stokes filter wheel 8 in a circular band (e.g., a band centered on a radius, RO) that is radially outward from the circular band, RI, in which the filter/reference apertures 18, 20, 22, 16, and 24 are disposed sequentially (consecutively). The trigger holes 15, 17, 19, 21, and 23 and the filter/reference apertures 18, 20, 22, 16, and 24 are generally substantially equally spaced around the Stokes filter wheel 8.

The optical chopper controller 7 generally sends a capture control signal (e.g., CAPT) (e.g., a 5-volt TTL voltage, or, alternatively any other appropriate signal to meet the design criteria of a particular application) to the frame grabber 11 via an electrical connection 4 when the optical chopper controller 7 receives the trigger signal TRIG from the sensor 25.

The computer program in the system 10 internally transmits to the frame grabber apparatus 11 a frame grab control signal (e.g., GRAB) that determines a selected number of video frames VIDIM for capture by the frame grabber apparatus 11, and a starting time for the capture of the video frames VIDIM.

The frame grabber apparatus 11 generally sends the capture control signal CAPT to the video camera 9 via the electrical connection 5 when the optical chopper controller 7 receives the trigger signal TRIG from the sensor 25. The video camera 9 generally sends a captured video frame 28 (i.e., the image VIDIM) to the frame grabber 11 via an electrical connection 6 when the shutter of the video camera 9 closes. The electrical couplings 1, 3, 4, 5, and 6 generally transmit/receive the respective trigger, control, and video image signals (e.g., the signals CAPT, MODE, TRIG, ROT, and VIDIM). The frame grabber apparatus 11 generally formats (e.g., generates an appropriate image file in a protocol such as BMP, JPG, TIF, MPEG, etc.) the raw image frame data 28 (VIDIM) from the video camera 9 and saves the formatted image file to a hard drive (not shown) in the computer system 10. The saved (i.e., recorded, captured, held, stored, etc.) image file VIDIM is generally processed via the computer system 10 to generate the respective Stokes parameters, as detailed below.

Referring specifically to FIG. 2, the video camera 9 generally comprises a lens 26 and the video frame 28 that generally includes the scene image 29. The video frame 28 generally comprises an array of light sensitive receptors (e.g., CCD elements) that may correspond to pixels in the scene 13. However, the video frame 28 may be implemented using any appropriate receptors to meet the design criteria of a particular application. The polarization standard 30 generally comprises a linear polarizer 31 and a circular polarizer 32. The polarization standard 30 is generally implemented in a region of the scene 13 that is peripheral to points for which the user desires to generate corresponding polarization profiles.

A region of the scene 13 generally presents (i.e., emanates, sends, projects, emits, etc.) rays (i.e., beam, light, etc.) 14 that may be received by (i.e., transmitted to) the Stokes filter wheel 8. The ray 14 may be a scene ray. The ray 14 is generally emitted in the direction of the z axis. The user of the system 12 generally desires the polarization parameters related to (corresponding to) the region of the scene 13 that presents the rays 14.

The Stokes filter wheel 8 may present a respective ray 39 to a narrowband color filter 40. The narrowband color filter 40 may present a respective ray 41 to the lens 26 of the video camera 9. The lens 26 of the video camera 9 may present a respective ray 27 to the video frame 28 as the respective scene image 29. Light rays (e.g., the rays 14, 39, 41, and 27) are generally presented along the optical axis of the system 12 (i.e., along the z axis).

With continued reference to FIG. 2, in connection with the polarization standard 30, the linear polarizer (i.e., the polarization standard linear polarizer) 31 may present a ray 33, and the circular polarizer (i.e., the polarization standard circular polarizer) 32 may present a ray 34. The rays 33, 34 are generally a polarization standard linear polarizer ray and a polarization standard circular polarizer ray, respectively. The rays 33, 34 are generally transmitted through the Stokes filter wheel 8 (i.e., through one of the polarizers 16, 18, 20, and 22), through the color filter 40 and the video camera 9 (i.e., through the lens 26) to the video frame 28, and may form respective polarization standard images 35, 36 on the video frame 28. The image 35 generally corresponds to the ray 33 and the image 36 generally corresponds to the ray 34. The images 35, 36 may be integral to a peripheral region of the scene image 29.

Because the four unique images VIDIM that are used to determine the Stokes parameters are not generally acquired instantaneously (i.e., not substantially simultaneously), the polarization standard 30 may be implemented (e.g., placed in the scene 13) to provide for testing the validity of recorded data (e.g., recorded versions of the video frame 28, VIDIM). Data is generally rejected as invalid when the polarization parameters of the standard (e.g., polarization parameters that correspond to the polarization standard images 35, 36) such as degree of polarization, azimuth angles, and ellipticity angles, fail to correspond to respective known (e.g., predetermined, expected, etc.) values (e.g., amounts, levels, etc.). The respective known values are generally obtained (i.e., measured, predetermined, etc.) in a laboratory under controlled lighting and other relevant parameter conditions.

The linear and circular polarizers (e.g., the polarizers 18, 20, 22, and 16) assembled in the Stokes filter wheel 8 may have any orientation when appearing in the field of view of video camera 9. However, in one example, to simplify calculations and to optimize results, the transmission axes of the linear polarizers and the fast axis of the circular polarizer may have the following orientations: (i) linear polarizer 22 may be horizontally oriented when the trigger hole 19 is at the sensor 25, (ii) the transmission axis of linear polarizer 20 may be vertically oriented when trigger hole 17 is at the sensor 25, (iii) the transmission axis of linear polarizer 18 may be oriented at an angle of 45 degrees to the horizontal when trigger hole 15 is at the sensor 25, and (iv) the fast axis of the circular polarizer may be vertically oriented when trigger hole 23 is at the sensor 25.

With continued reference to FIG. 2, light from the scene 13 (e.g., the ray 14) is generally incident upon the Stokes filter wheel 8. The ray 14 may be transmitted through one of the three linear polarizers (i.e., the polarizers 18, 20, and 22), the circular polarizer 16, or, alternatively, may be incident on the opaque reference screen 24. The ray 14 is generally transmitted through the linear polarizer 22, with the respective transmission axis horizontally oriented, when the trigger hole 19 is at the sensor 25. The ray 14 is generally transmitted through the linear polarizer 20, with the respective transmission axis vertically oriented, when trigger hole 17 is at the sensor 25. The ray 14 is generally transmitted through the linear polarizer 18, with the respective transmission axis oriented at an angle of 45 degree to the horizontal, when the trigger hole 15 is at the sensor 25. The ray 14 is generally transmitted through the circular polarizer 16, with the respective fast axis horizontally oriented, when the trigger hole 23 is at the sensor 25. As the reference screen 24 is opaque, optical transmission through the reference screen 24 is generally impossible. The respective blank video image VIDIM related to the ray 14 that is generally incident on the reference screen 24 may identify (indicate) a completed revolution of the rotating Stokes filter wheel 8.

The light that exits from the rotating Stokes filter wheel (e.g., the ray 39) may be transmitted through the narrowband color filter 40. The light that exits from the narrowband color filter 40 (e.g., the ray 41) may be transmitted through the lens 26 of the video camera 9. The light that exits from the lens of the video camera 26 (e.g., the ray 27) is generally focused (or projected) onto the video frame 28 to form (i.e., generate, produce, etc.) the image 29 (and the respective video image VDIM) of the scene 13.

All of the video frames (e.g., the video frame 28) are generally downloaded (as the respective video images VIDIM) into the computer system 10 via the connection 6 and the frame grabber 11. The images 29 (i.e., the images VIDIM) may be stored (e.g., written to memory, held, etc.) for processing by the computer (e.g., controller, processor, etc.) system 10 using appropriate programming. Computer programming is generally stored on appropriate media (i.e., memory such as RAM, ROM, PROM, etc., not shown) in the computer system 10, and, in one example, implemented to crop (e.g., edit, trim, etc.) selected (e.g., chosen, picked, etc.) corresponding picture elements (pixels) from each 2-D image 29. The pixel values of each video frame 28 (e.g., the image 29) VIDIM may form a matrix, M. The computer programming generally identifies the pixel values of the video image VIDIM that corresponds to the reference screen 24 as an indicator that the rotating Stokes filter wheel 8 has completed a revolution and that a new set of video images VIDIM are to be recorded.

The chopper controller 11 transmits the speed control signal ROT to the motor 42 to control rotational speed of the motor 42, and a computer program in the system 10 sends mode control signals MODE to the video camera 9 to establish the mode of operation and exposure time. The computer program in the computer 10 internally transmits the frame grab control signal GRAB to the frame grabber apparatus 11. The frame grab control signal GRAB determines a selected number of video frames VIDIM for capture by the frame grabber apparatus 11, and a starting time for the capture of the video frames.

When the frame grabber 11 initiates video image capture via the capture control signal CAPT, the chopper controller 7 receives the trigger signal TRIG from the sensor 25, and generates the capture control signal CAPT in response to the trigger signal TRIG, and transmits the capture control signal CAPT to the frame grabber apparatus 11, and the frame grabber apparatus 11 transmits the capture control signal CAPT to the video camera 9 to activate exposure, and the video camera 9 transmits the captured video image VIDIM to the frame grabber 11 to be processed by the computer program in the system 10.

Because the Stokes parameters generally use intensity, I, measurements, and the light sensor array in the video camera 9 generally records RGB values, x, a relationship between x and I is generally obtained for the light sensor array of all recorded frames 28 (i.e., the images VIDIM). In one example, a calibration method for obtaining the relationship between x and I is to pass a beam (or ray) of light through neutral density filters of different optical densities, y, and to record (or otherwise determine) an average x value for each respective y value. One of ordinary skill in the art would understand that the x and y of the intensity, I, relationship (e.g., Equations 1-3 below) is generally different from the relative Cartesian coordinates x and y. Curve-fitting (e.g., performed using programming via the computer system 10) generally yields y as a function of x as follows.

$$y=f(x) \quad \text{(Equation 1)}$$

Because some light sensor arrays may be implemented as multi-channel arrays, a relationship between RGB values, x, and optical densities, y, is generally obtained for each channel. The optical density, y, is generally related to the intensity, I, using the relationship as follows.

$$I=10^{-y} \quad \text{(Equation 2)}$$

Equation 1 may be substituted into the Equation 2 to yield a calibration relationship between I and x as follows:

$$I=10^{-f(x)} \quad \text{(Equation 3)}$$

Using Equation 3, each pixel value, x, in each of the scene matrices $M_1, M_2, M_3 \ldots M_n$ can be converted to a respective intensity value in new intensity matrices $I_1, I_2, I_3 \ldots I_n$.

Four consecutive intensity matrices (e.g., $I_1, I_2, I_3, I_4$) may be used to obtain the Stokes parameters for each point in the scene 13. Equation 4 may be used to calculate the Stokes parameters for each point in scene 13 as follows:

$$S_0 = I_1 + I_2$$

$$S_1 = (\delta/\sin\delta)[(\sin\delta + \cos\delta)I_1 + (\sin\delta - \cos\delta)I_2 - 2\sin\delta I_3]$$

$$S_2 = (\delta/\sin\delta)[(\sin\delta - \cos\delta)I_1 - (\sin\delta + \cos\delta)I_2 + 2\sin\delta I_3]$$

$$S_3 = (S_0 + S_2\cos\epsilon - 2I_4)/\sin\epsilon \quad \text{(Equation 4)}$$

where $\delta$ is the angular rotation of the Stokes filter wheel during exposure. $\delta$ is a function of the frame rate (F) of the Stokes filter wheel and the exposure time (t) according to $$\delta = 72Ft \text{(degrees)}.$$

As $\delta$ approaches zero, $\sin\delta$ approaches $\delta$, $\delta/\sin\delta$ approaches 1, and $$S_1 = I_1 - I_2$$

$$S_2 = 2I_3 - I_1 - I_2 = 2I_3 - S_0$$

The equation for the fourth Stokes parameter, $S_3$, as given in Equation 4, is based on a left circular polarizer (i.e., the transmitted electric field vectors rotate counter clock-wise). As circular polarizers such as the polarizer 16 are generally implemented using birefringent materials (e.g., at least one quarter-wave retarder), a phase difference, $\epsilon$, which is wavelength, $\lambda$, dependent may occur between light traveling along the fast and slow axes. The relationship between $\epsilon$ and $\lambda$ is generally determined before the system 12 is used to accurately determine the fourth Stokes parameter. A birefringent material may be implemented as an optically anisotropic material such as calcite and quartz that generally provides for the splitting of a light wave into two transmitted waves having different velocities.

Each of the corresponding elements in the matrices $S_0$, $S_1$, $S_2$, $S_3$ (e.g., elements $s^{(0)}_{11}$, $s^{(1)}_{11}$, $s^{(2)}_{11}$, $s^{(3)}_{11}$ are generally associated with a point (x, y) (i.e., a point having Cartesian coordinates with respective horizontal and vertical values x and y) in the scene 13. Thus, the polarization state of points (x, y) in the scene 13 can be determined (e.g., calculated using programming that may be stored in a medium in the computer system 10) using the relationships as follows.

$$\sin 2\chi = S_3/(S_1^2 + S_2^2 + S_3^2)^{1/2}$$

$$\tan 2\psi = S_2/S_1$$

$$P = (S_1^2 + S_2^2 + S_3^2)^{1/2}/S_0, \quad \text{(Equations 5)}$$

Where $\chi$ is the polarization ellipticity angle, $\psi$ is the polarization azimuth angle, and P is the degree of polarization.

As is apparent then from the above detailed description, the present invention may provide an improved system and an improved method for acquiring sufficient data to rapidly measure the four Stokes parameters, when compared to conventional approaches. The present invention may reduce or eliminate temporal errors and spatial errors that can be generated when conventional approaches are implemented.

Various alterations and modifications will become apparent to those skilled in the art without departing from the scope and spirit of this invention and it is understood this invention is limited only by the following claims.

What is claimed is:

1. A system for determining polarization profiles of points in a scene from video frames using Stokes parameters, the system comprising:
   a scene having a region that emits scene light rays that correspond to the points in the scene;
   a motorized rotating Stokes filter wheel having
      three linear polarizers, a circular polarizer, and a reference screen consecutively located in apertures on the wheel in a first radial band, and
      five trigger holes located adjacent to respective ones of the polarizers and the screen in a second radial band that is outward on the wheel from the apertures;
   a sensor that generates a trigger signal when any one of the trigger holes passes by the sensor;
   a narrowband color filter;
   a video camera having a video frame;
   an optical chopper controller; and
   a computer system containing programming, and having a frame grabber apparatus, wherein
      the optical chopper controller transmits a speed control signal to control rotational speed of the motor, and the programming sends a mode control signal to the video camera to establish mode of operation and exposure time;
      the programming internally transmits to the frame grabber apparatus a frame grab control signal that determines a selected number of video frames for capture by the frame grabber apparatus, and a starting time for the capture of the video frames;
      when the frame grabber initiates capture, the chopper controller receives the trigger signal from the sensor, and generates a capture control signal in response to the trigger signal, and transmits the capture control signal to the frame grabber apparatus, and the frame grabber apparatus transmits the capture control signal to the video camera activating exposure, and the video camera transmits the captured video image to the frame grabber to be processed by the programming;
      the scene light rays are transmitted consecutively through the polarizers in the Stokes filter wheel and the color filter to the video camera;
      images corresponding to the scene light rays are projected onto respective pixels in the video frame and recorded as respective two-dimensional (2-D) arrays in response to the trigger signal; and
      the images corresponding to the scene light rays from four unique images obtained from light transmitted consecutively through the three linear polarizers and the circular polarizer of the rotating Stokes filter wheel are formatted by the frame grabber apparatus and are used by the programming to calculate respective Stokes parameters of the points in the scene, and the image corresponding to the reference screen indicates a completed revolution of the rotating Stokes filter wheel.

2. The system of claim 1 further comprising a polarization standard at a region in the scene separate from the region of the scene that emits the scene light rays, wherein:
   the polarization standard comprises a fourth linear polarizer that emits a linear polarization standard light ray, and a second circular polarizer that emit a circular polarization standard light ray, wherein
   the linear polarization standard light ray, and the circular polarization standard light ray are transmitted through the three linear polarizers and the circular polarizer of the Stokes filter wheel and the color filter to the video camera,
   images corresponding to the linear polarization standard light ray and the circular polarization standard light ray are projected onto respective pixels in the video frame and recorded,
   the images corresponding to the linear polarization standard light ray and the circular polarization standard light ray from four unique images, obtained from light transmitted consecutively through the three linear polarizers and the circular polarizer of the rotating Stokes filter wheel, that are used by the programming in the computer system are used to solve for respective Stokes parameters of the linear polarization standard light ray and the circular polarization standard light ray, and
   data related to the scene is rejected as invalid when the polarization parameters of the linear polarization standard light ray and the circular polarization standard light ray fail to correspond to respective known values, wherein the respective known values are predetermined in a laboratory under controlled lighting conditions.

3. The system of claim 1 wherein total time duration to obtain the four unique images that are used to obtain the four Stokes parameters for each pixel in the scene is regulated by the rotational speed of the rotating Stokes filter wheel and the frame rate of the video camera, and the system generates a sufficient number of the unique scene images to generate the respective four Stokes parameters in nearly real time.

4. The system of claim 1 wherein the circular polarizer comprises at least one optically transparent, birefringent material.

5. The system of claim 1 wherein the rotating Stokes filter wheel is implemented as a precision motorized, rotating Stokes filter wheel having precise rotational speed control such that the angular velocity and angular acceleration of the rotating Stokes filter wheel are controlled within predetermined limits.

6. The system of claim 1 wherein the video camera further comprises a lens, and the video frame comprises an array of light sensitive receptors that correspond to the pixels.

7. The system of claim 1 wherein the three linear polarizers have transmission axes with three unique orientations with respect to the horizontal.

8. The system of claim 7 wherein the three unique orientations are vertical, horizontal, and 45 degrees.

9. A method of determining polarization profiles of points in a scene from video frames using Stokes parameters, the method comprising:
   emitting scene light rays from points in a region in a scene;
   rotating a motorized Stokes filter wheel having
      three linear polarizers, a circular polarizer, and a reference screen consecutively located in apertures on the wheel in a first radial band, and
      five trigger holes located adjacent to respective ones of the polarizers and the screen in a second radial band that is outward on the wheel from the apertures;
   generating a trigger signal using a sensor when any one of the trigger holes passes by the sensor;
   transmitting the scene light consecutively through the polarizers and the screen in the Stokes filter wheel and through a narrowband color filter to a video camera having a video frame;
   presenting the trigger signal from the sensor to an optical chopper controller that generates a control signal in response to the trigger signal, and transmits the control signal to a frame grabber apparatus, and the frame grabber apparatus transmits the control signal to the video camera;

projecting images corresponding to the scene light rays onto respective pixels in the video frame and recording the images as respective two-dimensional (2-D) arrays in response to the trigger signal; and transmitting consecutively the images corresponding to the scene light rays from four unique images obtained from light through the three linear polarizers and the circular polarizer of the rotating Stokes filter wheel to the frame grabber apparatus, formatting the images using the frame grabber apparatus, using programming in a computer system to calculate respective Stokes parameters of the points in the scene, and indicating a completed revolution of the rotating Stokes filter wheel using the image corresponding to the reference screen.

10. The method of claim 9 further comprising implementing a polarization standard at a region in the scene separate from the region of the scene that emits the scene light rays, wherein:

the polarization standard comprises a fourth linear polarizer that emits a linear polarization standard light ray, and a second circular polarizer that emit a circular polarization standard light ray, wherein the linear polarization standard light ray, and the circular polarization standard light ray are transmitted through the three linear polarizers and the circular polarizer of the Stokes filter wheel and the color filter to the video camera, images corresponding to the linear polarization standard light ray and the circular polarization standard light ray are projected onto respective pixels in the video frame and recorded, the images corresponding to the linear polarization standard light ray and the circular polarization standard light ray from four unique images, obtained from light transmitted consecutively through the three linear polarizers and the circular polarizer of the rotating Stokes filter wheel, that are used by the programming in the computer system are used to solve for respective Stokes parameters of the linear polarization standard light ray and the circular polarization standard light ray, and data related to the scene is rejected as invalid when the polarization parameters of the linear polarization standard light ray and the circular polarization standard light ray fail to correspond to respective known values, wherein the respective known values are predetermined in a laboratory under controlled lighting conditions.

11. The method of claim 9 wherein total time duration to obtain the four unique images that are used to obtain the four Stokes parameters for each pixel in the scene is regulated by the rotational speed of the rotating Stokes filter wheel and the frame rate of the video camera, and the system generates a sufficient number of the unique scene images to generate the respective four Stokes parameters in nearly real time.

12. The method of claim 9 wherein the circular polarizer comprises at least one optically transparent, birefringent material.

13. The method of claim 9 wherein the rotating Stokes filter wheel is implemented as a precision motorized, rotating Stokes filter wheel having precise rotational speed control such that the angular velocity and angular acceleration of the rotating Stokes filter wheel are controlled within predetermined limits.

14. The method of claim 9 wherein the video camera further comprises a lens, and the video frame comprises an array of light sensitive receptors that correspond to the pixels.

15. The method of claim 9 wherein the three linear polarizers have transmission axes with three unique orientations with respect to the horizontal.

16. The method of claim 15 wherein the unique orientations are vertical, horizontal, and 45 degrees.

* * * * *